United States Patent [19]

Bertrand

[11] Patent Number: 5,052,703
[45] Date of Patent: Oct. 1, 1991

[54] DOLLY

[76] Inventor: Stafford Bertrand, 7012 West Hwy., #105, Orange, Tex. 77630

[21] Appl. No.: 626,401

[22] Filed: Dec. 14, 1990

Related U.S. Application Data

[63] Continuation of Ser. No. 514,118, Apr. 25, 1990, abandoned.

[51] Int. Cl.$^5$ .............................................. B62B 5/00
[52] U.S. Cl. ............................ 280/47.34; 280/79.11
[58] Field of Search .................. 248/129; 280/35, 404, 280/413, 501, 47.34, 47.35, 47.131, 87.01, 79.11, 79.4

[56] References Cited

U.S. PATENT DOCUMENTS

| | | | |
|---|---|---|---|
| 1,322,719 | 11/1919 | Nelson | 280/79.11 X |
| 2,246,882 | 6/1941 | Gentry | 280/79.4 X |
| 2,277,787 | 3/1942 | Scott | 280/79.4 X |
| 2,349,251 | 5/1944 | Domoj | 280/79.4 X |
| 2,472,952 | 6/1949 | Lennard | 280/79.11 X |
| 3,918,733 | 11/1975 | Macho et al. | 280/79.11 X |

Primary Examiner—Andres Kashnikow
Assistant Examiner—Michael Mar

[57] ABSTRACT

A dolly for moving bulky or heavy loads wherein the dolly includes a plurality of platforms having a padding element placed about each platform and a well defined by upstanding wall portions. The platforms are linked by an articulated arm structure which is pivotally attached at its rear end to each platform by hinged connections and attached at its forward end to form the linkage.

3 Claims, 2 Drawing Sheets

DOLLY

This application is a continuation of Ser. No. 07/514,118 filed Apr. 25, 1990, now abandoned.

FIELD OF THE INVENTION

This invention consists of a dollie having a plurality of platforms used to transport bulky items.

SUMMARY OF THE INVENTION

The dollie of the present invention consists of a plurality of platforms, preferably two in number, connected by an arm consisting of a plurality of sections, preferably four or five in number. Each platform bears an upstanding wall portion which defines a well into which is placed a portion of the item to be moved, for example, the leg of a desk might be placed in one of the wells. Each platform is raised above the floor or horizontal surface upon which it rests by a plurality of wheels or casters which wheels or casters pivot allowing the dollie to be moved in many directions across the floor. The top edge portion of the wall of the platform is approximately four (4) inches above the floor and the underside of the platform is approximately one and one-half (1½) inches above the floor. The sides of each platform are surrounded by a padded bumper which functions to protect the platform from scuffing or scarring walls or furnishings into which it might come into contact.

The articulated arm is composed preferably of three or four or five parts. The four part arm, for example, is composed of two rigid arm portions each of which is joined by a pin connection at its rear end to a tongue extending outwardly from one of the respective platforms. The forward end of each arm portion are joined together to connect the two platforms. The pin connections function as pivot points, that is as hinges. The five part arm, for example, is similar to the four part arm with the two arm portions connected at their rear end to the platform tongues and at their forward end to a common member or handle. Again, the pin connections function as pivot points, that is, as hinges. The three part arm is similar to the five part arm by including two arm portions, a common handle to which the forward ends of the arm portions are pinned and the rearward ends of the arm portions are connected directly to the platforms. All hinges are fabricated of solid steel to achieve a good connection as well as for strength and durability and to avoid excessive wear.

In use, each platform is positioned and a portion of the item to be moved is loaded into the well of the respective platform. The item is then transferred from one location to another via force placed on the item itself.

DETAILED DESCRIPTION OF THE INVENTION

Figure 1:
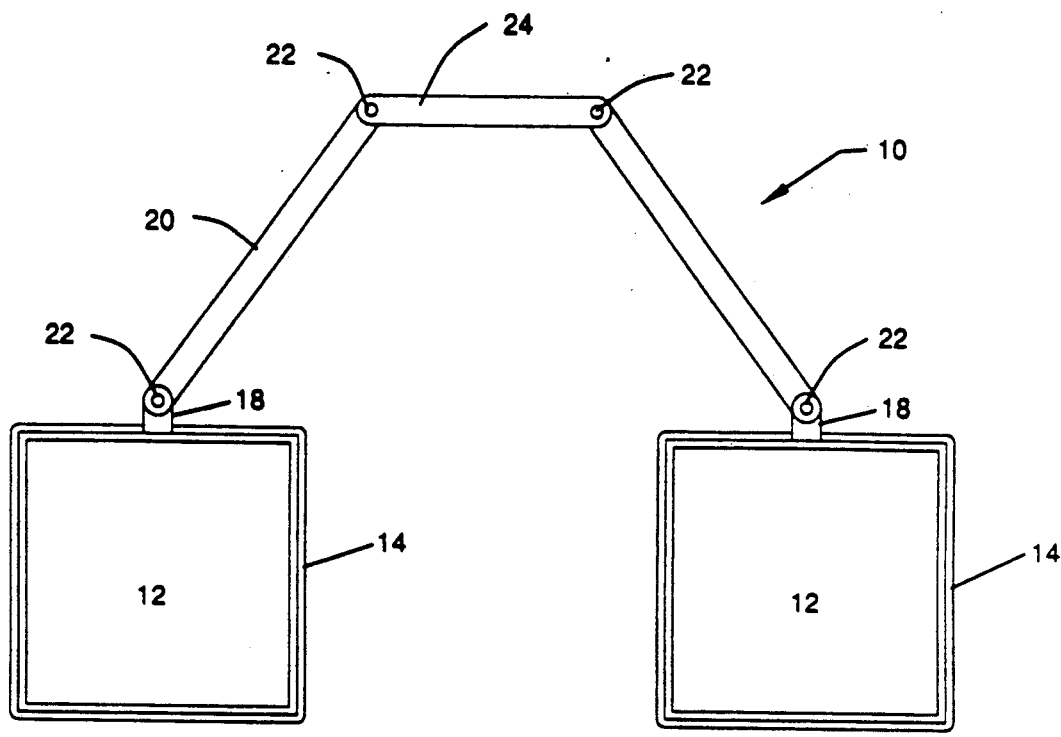
FIG. 1 is a top view of the dollie of the present invention.
Figure 2:
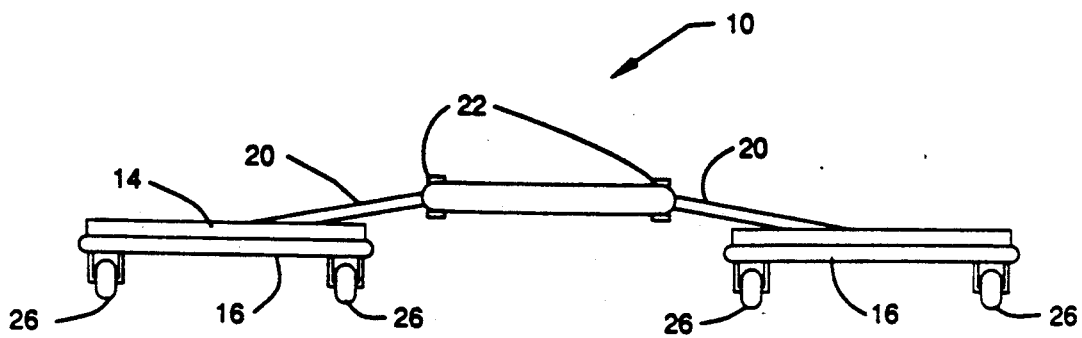
FIG. 2 is an elevation view of the dolly shown in FIG. 1.
Figure 3:
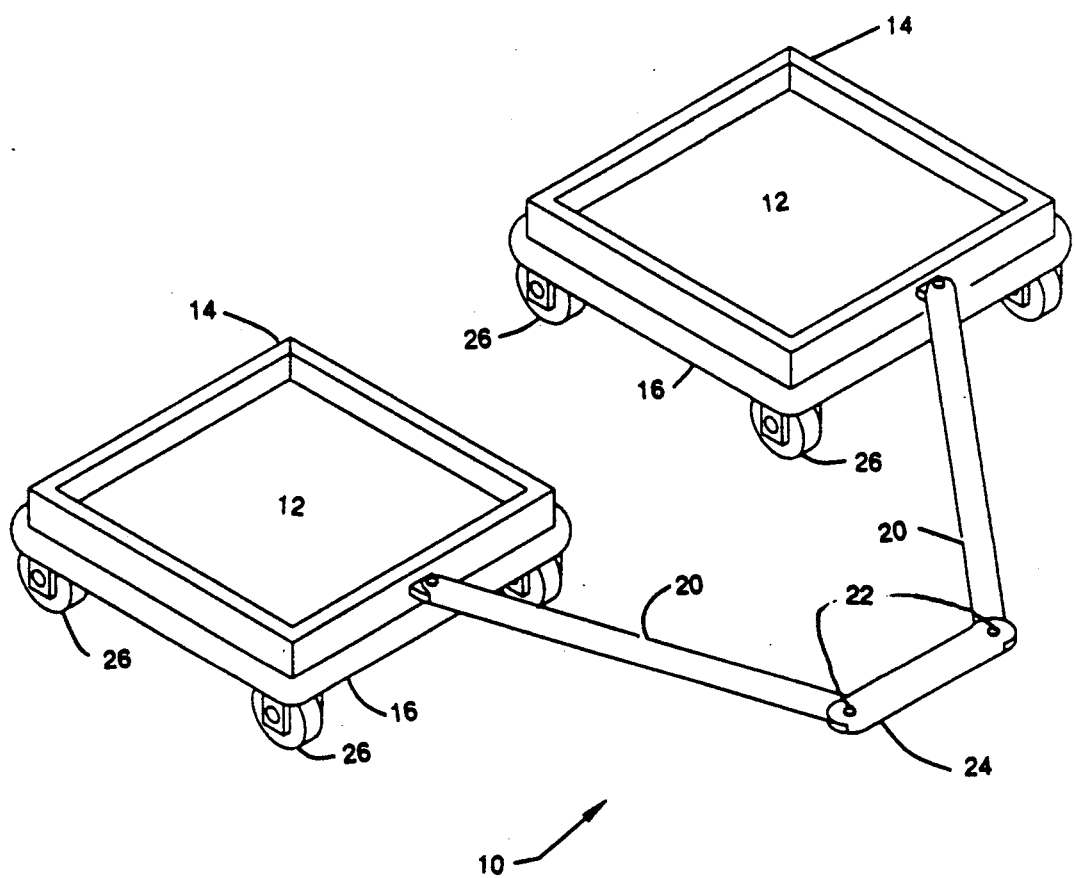
FIG. 3 is a perspective view of the dolly shown in FIG. 1.

One embodiment of the dollie of the present invention, designated as 10 in FIGS. 1 and 2, includes a plurality of platforms 12. Each platform 12 includes an upstanding wall portion 14 surrounding it and defining a well 15 therein. In addition, each platform 12 includes a scuff resistant padded bumper 16 placed about a portion of its exterior as shown; and, each platform 12 includes a tongue 18 extending therefrom. A linkage means includes a rigid arm 20 which is connected to each tongue 18 by a hinge pin 22; each articulated arm 20 is connected at its forward end to a common handle 24 (or to the other arm 20 in the four part arm not shown) by a hinge pin 22. Each platform is movable about the horizontal surface upon which it rests by pivotable wheels or casters 26 attached to its bottom.

In use an item (not shown) to be moved, such as a desk, is placed on the platforms 12 with its legs positioned in the wells 15 of the platforms 12. As is obvious, the item would maintain the relative spacing of the platforms 12 during moving and the movement may be initiated and controlled by forces exerted on the handle 24 or on the item or both.

I claim:

1. A dolly for moving a bulky item comprising:
   first and second platforms each connected to another by linkage means;
   each of said platforms being supported by a plurality of wheels,
   each of said platforms including an upstanding wall portion which wall portion defines a well into which may be inserted a portion of said item to be moved;
   each of said platforms further including a scuff resistant bumper portion placed about an exterior portion of said respective platform;
   each of said platforms further including a front portion having a respective tongue positioned exteriorally of and projecting forwardly from said front portion of each of said respective platforms; and
   said linkage means including a first rigid arm pivotally attached at a rearward end for movement about a vertical axis by a first pin connection to a respective tongue carried by said first platform, a second rigid arm pivotally attached at a rearward end for movement about a vertical axis by a second pin connection to a respective tongue carried by said second platform of said plurality of platforms, and an elongated rigid handle extending transversely between said first and second arms, said first arm being pivotally attached at a forward end for movement about a vertical axis to one end of said handle by a third pin and said second arm being pivotally attached at a forward end for movement about a vertical axis to an opposite end of said handle by a fourth pin.

2. The dolly of claim 1 wherein said linkage means includes a third arm pivotally connected at a rearward end to said distal end of said first arm, and includes a fourth arm pivotally connected at a rearward end to said distal end of said second arm, said third arm and said fourth arm being pivotally connected at their respective forward ends to said handle.

3. The dolly of claim 1 wherein said first, said second, said third, and said fourth pins are composed of steel for wear resistance.

* * * * *